(12) United States Patent
Jabr et al.

(10) Patent No.: US 9,461,965 B2
(45) Date of Patent: Oct. 4, 2016

(54) REDIRECTING OF NETWORK TRAFFIC FOR APPLICATION OF STATEFUL SERVICES

(71) Applicant: Cisco Technology, Inc., San Jose, CA (US)

(72) Inventors: Khalil A. Jabr, Lake Oswego, OR (US); Ray Blair, Keizer, OR (US); Victor M. Moreno, Carlsbad, CA (US); Massimiliano Ardica, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 597 days.

(21) Appl. No.: 13/645,694

(22) Filed: Oct. 5, 2012

(65) Prior Publication Data

US 2014/0101321 A1  Apr. 10, 2014

(51) Int. Cl.
*G06F 15/16* (2006.01)
*H04L 29/06* (2006.01)
*H04L 29/08* (2006.01)

(52) U.S. Cl.
CPC ....... *H04L 63/0218* (2013.01); *H04L 63/0254* (2013.01); *H04L 67/1027* (2013.01)

(58) Field of Classification Search
CPC ........... H04L 63/0254; H04L 63/0218; H04L 67/1027
USPC ....................................................... 709/227
See application file for complete search history.

(56) References Cited

U.S. PATENT DOCUMENTS

| | | | |
|---|---|---|---|
| 6,880,089 B1 | 4/2005 | Bommareddy et al. | |
| 7,131,140 B1 | 10/2006 | O'Rourke et al. | |
| 7,770,215 B2 | 8/2010 | O'Rourke et al. | |
| 7,792,113 B1 | 9/2010 | Foschiano et al. | |
| 2003/0018914 A1* | 1/2003 | Cheng ................. | H04L 63/0254 726/13 |
| 2009/0249438 A1* | 10/2009 | Litvin ................. | H04L 63/0263 726/1 |

OTHER PUBLICATIONS

Keller et al., Live Migration of an Entire Network (and its Hosts), Oct. 29, 2012, p. 1-14.*
Keller et al., Live Migration of an Entire Network (and its Hosts), Oct. 29, 2012, Princeton University, pp. 1-14.*
International Search Report and Written Opinion in International Application No. PCT/US2013/062527, mailed Dec. 6, 2013, 12 pages.

(Continued)

*Primary Examiner* — Hee Soo Kim
(74) *Attorney, Agent, or Firm* — Edell, Shapiro & Finnan LLC

(57) ABSTRACT

Techniques are presented herein for redirection between any number of network devices that are distributed to any number of sites. A first message of a flow is received from a network endpoint at a first network device. A relationship between the endpoint and the first network device is registered in a directory that maps endpoints for network devices. A state for the flow is stored at the first network device. A second message is received for the flow which is indicative of the first endpoint at a second network device. It is determined that the second network device does not store the flow state for the flow. Querying is performed to receive information indicative of the relationship between the endpoint and the first network device. The received information is stored in a cache at the second network device. Services are applied to the second message according to the stored information.

32 Claims, 14 Drawing Sheets

(56) References Cited

OTHER PUBLICATIONS

Gu et al., "Policies and dynamic information migration in DC; draft-gu-opsa-policies-migration-00", Network Working Group, Internet-Draft, Standards Track, Jun. 12, 2011, 30 pages.

Olteanu et al., "Effeciently Migrating Stateful Middleboxes," SIGCOMM'12, Aug. 13-17, 2012, pp. 93-94.

Keller, et al., "Live Migration of an Entire Network (and its Host)," Proceedings of the 11th ACM Workshop on Hot Topics in Networks, Oct. 2012, 14 pages.

* cited by examiner

REDIRECTING OF NETWORK TRAFFIC FOR APPLICATION OF STATEFUL SERVICES

TECHNICAL FIELD

The present disclosure relates to network environments utilizing stateful services, and firewalls in particular.

BACKGROUND

Modern networks deploy multiple firewalls across network environments. In deployments with multiple firewalls, processes are needed to handle situations when a flow begins at one firewall, but messages are subsequently sent or received through a different firewall. Some implementations use clustering solutions in which all firewalls in the cluster synchronize to a cluster master which, in turn, synchronizes to its cluster members. This allows all of the firewalls to receive the flow state for each flow being handled by every other firewall in the cluster.

For example, in a deployment with dual data centers, each having a direct link to the Internet, all of the firewalls synchronize to a cluster master. Such a system is expensive in terms of the bandwidth required to perform the necessary syncing. Specifically, synchronization would be required for every new flow in the network, which is cumbersome in a real world deployment that has up to millions of flows per second. When a deployment spans three or more sites, using three or more firewalls, the problem is magnified significantly.

DESCRIPTION OF EXAMPLE EMBODIMENTS

Overview

Techniques are presented herein for redirection between any number of network devices that are distributed to any number of sites. A first message of a flow is received from a network endpoint at a first network device. A relationship between the endpoint and the first network device is registered in a directory that maps endpoints for network devices. A state for the flow is stored at the first network device. A second message is received for the flow at the second network device which is indicative of the first endpoint. It is determined that the second network device does not store the flow state for the flow. Querying is performed to receive information indicative of the relationship between the endpoint and the first network device. The received information is stored in a cache at the second network device. Services are applied to the second message according to the stored information.

Example Embodiments

Figure 1:
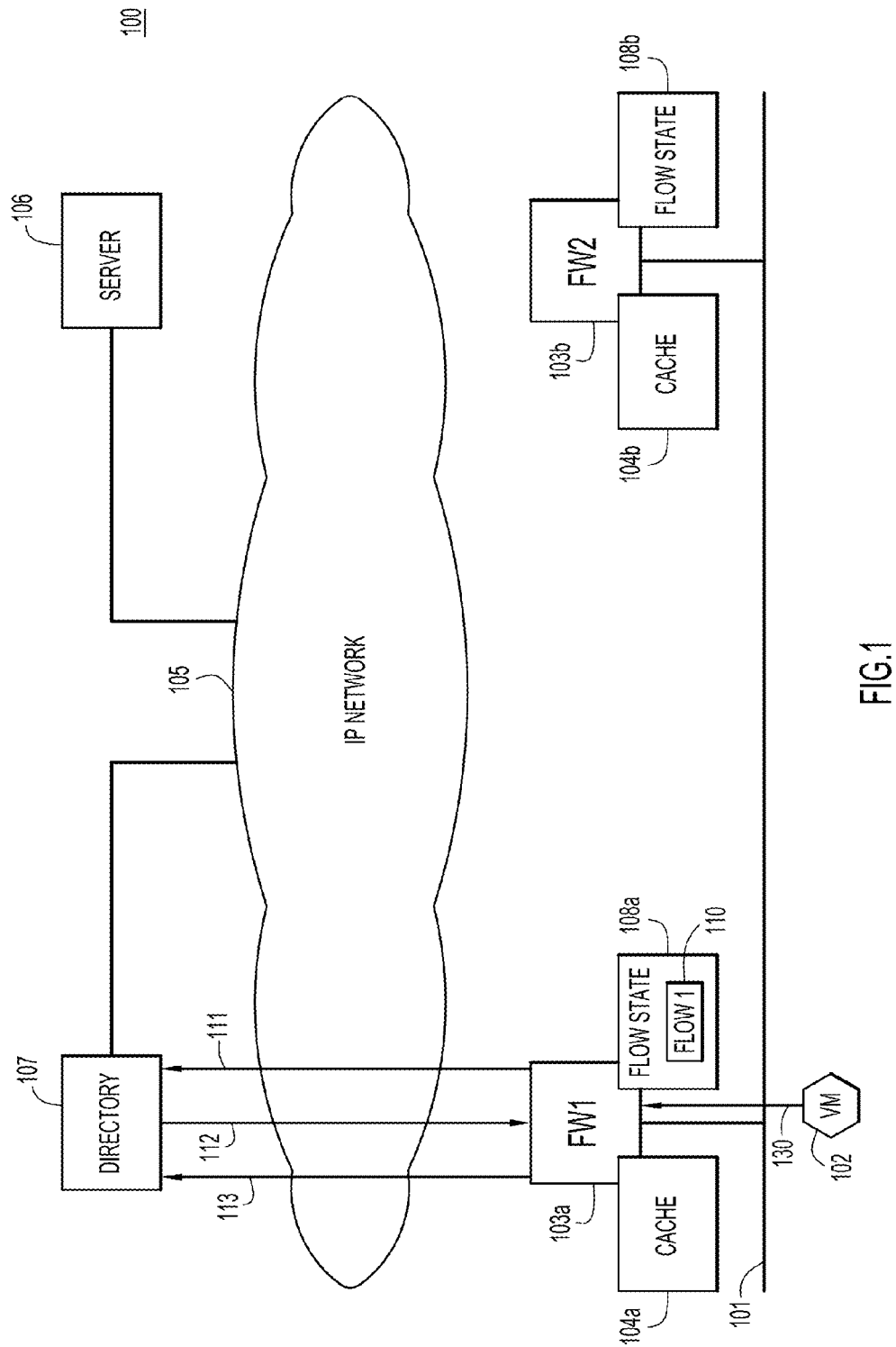
FIG. 1 illustrates an example computer network in which a firewall utilizes a mapping directory to implement redirecting of network traffic in a multi-firewall environment.

Depicted in FIG. 1 is a network environment 100 for intelligent redirecting of network traffic in a multi-firewall environment. While the present example is directed to a multi-firewall environment, the techniques herein may be applied to other environments which apply stateful services, for example environments implementing multiple load balancers, devices implementing wide area network (WAN) optimization, devices providing network address translation services, and devices providing intrusion detection. The above described services may be provided in layer 4 of the Open System Interconnection Model (OSI). Additional examples may include services provided by devices that operate at higher layers of the OSI model, such as session border controllers.

Connected to local area network (LAN) 101 are interior endpoints such as virtual machine (VM) 102. While virtual machine 102 is used as the specific example in FIG. 1, other endpoints, such as clients and servers, may be similarly situated, and their traffic handled in a manner similar to that presented herein for a virtual machine. Thus, in general, the virtual machine can be considered an example of a network endpoint, but the term "endpoint" is meant to include a physical device (client or server) as well as a virtual device, e.g., a virtual machine. Also connected to LAN 101 are firewalls 103a,b configured to perform smart redirecting of networking traffic, and each of which contains a cache 104a,b. Caches 104a,b store forwarding information, which will be explained in greater detail below with reference to FIGS. 2-8. Additionally, firewalls 103a,b include flow state tables 108a,b which contain the flow states for the flows being handled by the respective firewalls.

Firewalls 103a,b are each connected to Internet Protocol (IP) network 104, which, according to FIG. 1, is a network external to firewalls 103a,b. Connected to IP network 105 are external endpoints such as server 106.

Also depicted in FIG. 1 is mapping directory 107 in which the firewalls 103a,b register information indicative of which endpoints send messages through a specific firewall. In other words, directory 107 may be used to store information that maps a specific endpoint to a specific firewall. Specifically, firewalls 103a,b can map a current relationship with a network endpoint in mapping directory 107. For example, as described in more detail below, directory 107 is used to map the relationship between firewall 103a and virtual machine 102. Specifically, an entry in directory 107 indicates that virtual machine 102 sends messages through firewall 103a. While the directory 107 is shown external to the firewalls 103a,b and connecting to the other network nodes through IP network 105, directory 107 may be located at any network node so long as the directory can communicate with firewalls 103a,b. In fact, it may be advantageous for directory 107 to be located inside firewalls 103a,b, and communicate with firewalls 103a,b through LAN 101.

As depicted in FIG. 1, virtual machine 102 sends a synchronize (SYN) message 130, such as a SYN packet according to the Transmission Control Protocol (TCP), to establish a communication session between virtual machine 102 and server 106. The communication session is referred to as termed "Flow 1." Initially, firewall 103a checks to verify whether or not firewall 103a already maintains the flow state for Flow 1. The flow state may be contained within firewall 103a in flow state table 108a. Alternatively, because message 130 is a SYN message, firewall 103b may assume that no flow state is currently present in flow state table 108a for Flow 1.

In this instance, virtual machine 102 and the accompanying SYN message 130 are new to firewall 103a. Accordingly, firewall 103a sends message 111 to determine whether another firewall, such as firewall 103b, is already aware of virtual machine 102. In other words, firewall 103a uses directory 107 to determine if virtual machine 102 was previously mapped to another firewall. In this instance, directory 107 responds with message 112 indicating that the virtual machine 102 is not known to directory 107. Accordingly, firewall 103a sends message 113 to directory 107 registering the relationship between firewall 103a and virtual machine 102.

Message 113 comprises sufficient information to identify both virtual machine 102 and firewall 103a. For example, message 113 may include the internal prefixes of the LAN addresses for the firewall 103a and the virtual machine 102, as the prefix is sufficient to identify these network entities on the internal network. Of course, other identifying information, or other addresses for the network entities may be used. With the registration of the relationship between virtual machine 102 and firewall 103a in directory 107, other firewalls will be able to determine that virtual machine 102 was previously mapped to firewall 103a, and also determine that firewall 103a maintains the flow state for Flow 1.

Finally, firewall 103a creates entry 110 in flow state table 108a to maintain the flow state for Flow 1.

Depending on the specific implementation, it may not be beneficial to register entries in directory 107 based upon SYN messages sent from external endpoints, such as server 106. If there are no such security concerns, or such concerns are outweighed by other considerations, registrations in directory 107 may be made based upon SYN messages sent from external endpoints.

Figure 2:
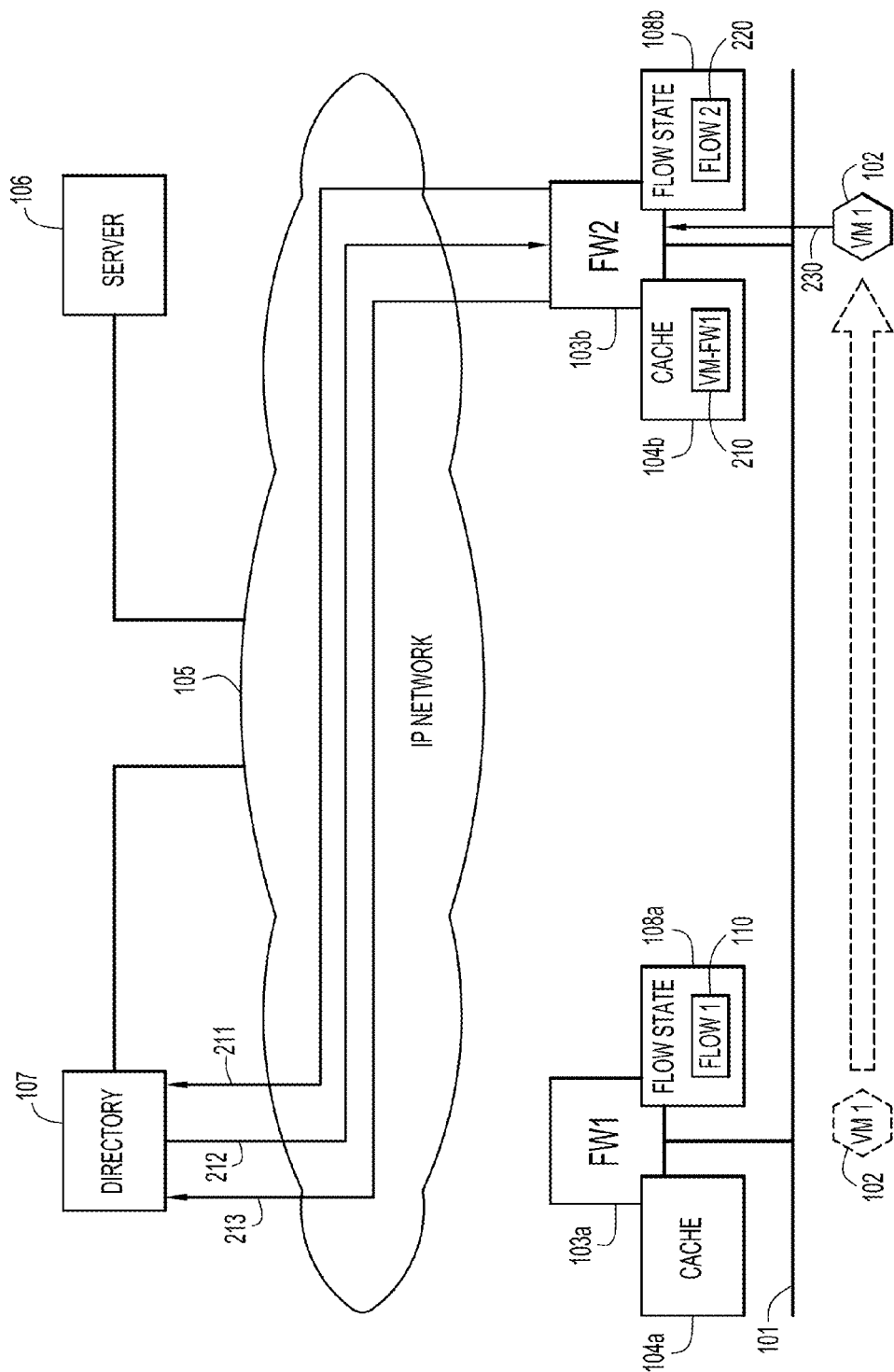
FIG. 2 illustrates an example computer network in which a firewall utilizes a mapping directory to implement redirecting of network traffic in a multi-firewall environment.

Turning now to FIG. 2, virtual machine 102 has moved so that messages sent from virtual machine 102 will now be received at firewall 103b as opposed to firewall 103a. This change may be the result of a physical move by virtual machine 102, the use of virtualized servers, or other concerns, such as network load balancing. When virtual machine 102 sends SYN message 220 to initiate a new flow, referred to as Flow 2, firewall 103b immediately determines whether it contains a flow state for virtual machine 102 in flow state table 108b. Because virtual machine 102 has just moved, there is presently no flow state in firewall 103b for virtual machine 102, nor is there an entry in cache 104b indicating another firewall has previously registered virtual machine 102. Alternatively, because message 230 is a SYN message, firewall 103b may simply make the determination that the flow is a new flow, and therefore, it is not currently being handled by the firewall 103b or any other firewall.

Firewall 103b sends query 211 to directory 107 to determine if virtual machine 102 has been previously registered. This is important because even though message 230 initiated a new flow, Flow 2, it is likely that messages from other flows, such as Flow 1, will now also be sent from virtual machine 102 through firewall 103b. Accordingly, it may be necessary for firewall 103b to be able to determine where those flow states are maintained. As virtual machine 102 was previously registered as described above in reference to FIG. 1, response 212 will indicate that virtual machine was previously associated with firewall 103a. Upon receiving response 212, firewall 103b places an entry 210 in cache 104b which indicates that virtual machine 102 was previously registered to firewall 103a. Furthermore, firewall 103b registers itself with virtual machine 102 in directory 107 through message 213. Finally, firewall 103b creates an entry 220 in flow state table 108b to handle the state of new Flow 2.

Accordingly, at the completion of the processing depicted in FIG. 2, virtual machine 102 is registered to firewall 103b in directory 107, firewall 103b maintains the state for Flow 2 initiated by message 220, cache 104b has an entry indicating that virtual machine 102 was previously registered to firewall 103a, and firewall 103a maintains the state for Flow 1.

Figure 3:
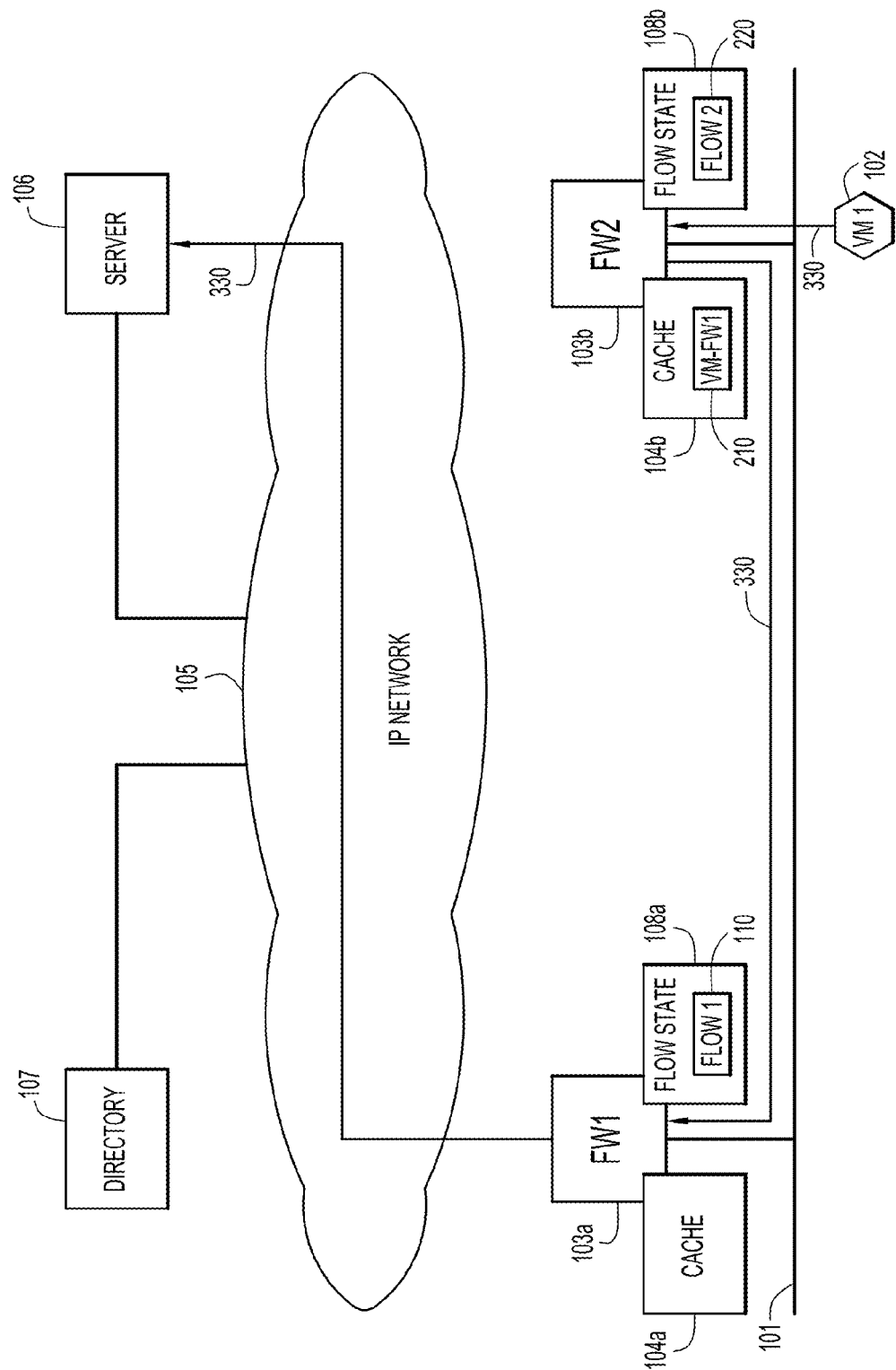
FIG. 3 illustrates an example redirection of messages and application of firewall policies to network traffic in a multi-firewall environment.

Turning to FIG. 3, a message 330 sent from virtual machine 102 as part of Flow 1. Firewall 103b first checks flow state table 108b to determine if there is an entry for Flow 1. In other words, because the message is part of an already established flow, message 330 is not a SYN message. Because there is no entry for Flow 1, firewall 103b checks cache 104b and finds that virtual machine 102 had previously been registered with firewall 103a. Accordingly, firewall 103b forwards message 330 to firewall 103a. If the message is sent as an IP packet, the message may be forwarded according to IP-in-IP encapsulation. Upon receipt of message 330, firewall 103a checks flow state table 108a and determines that it does maintain the state for Flow 1 in entry 110. Accordingly, firewall 103a applies the appropriate services, in this case firewall policies, to the message, in this case, forwarding the message to server 106.

Figure 4:
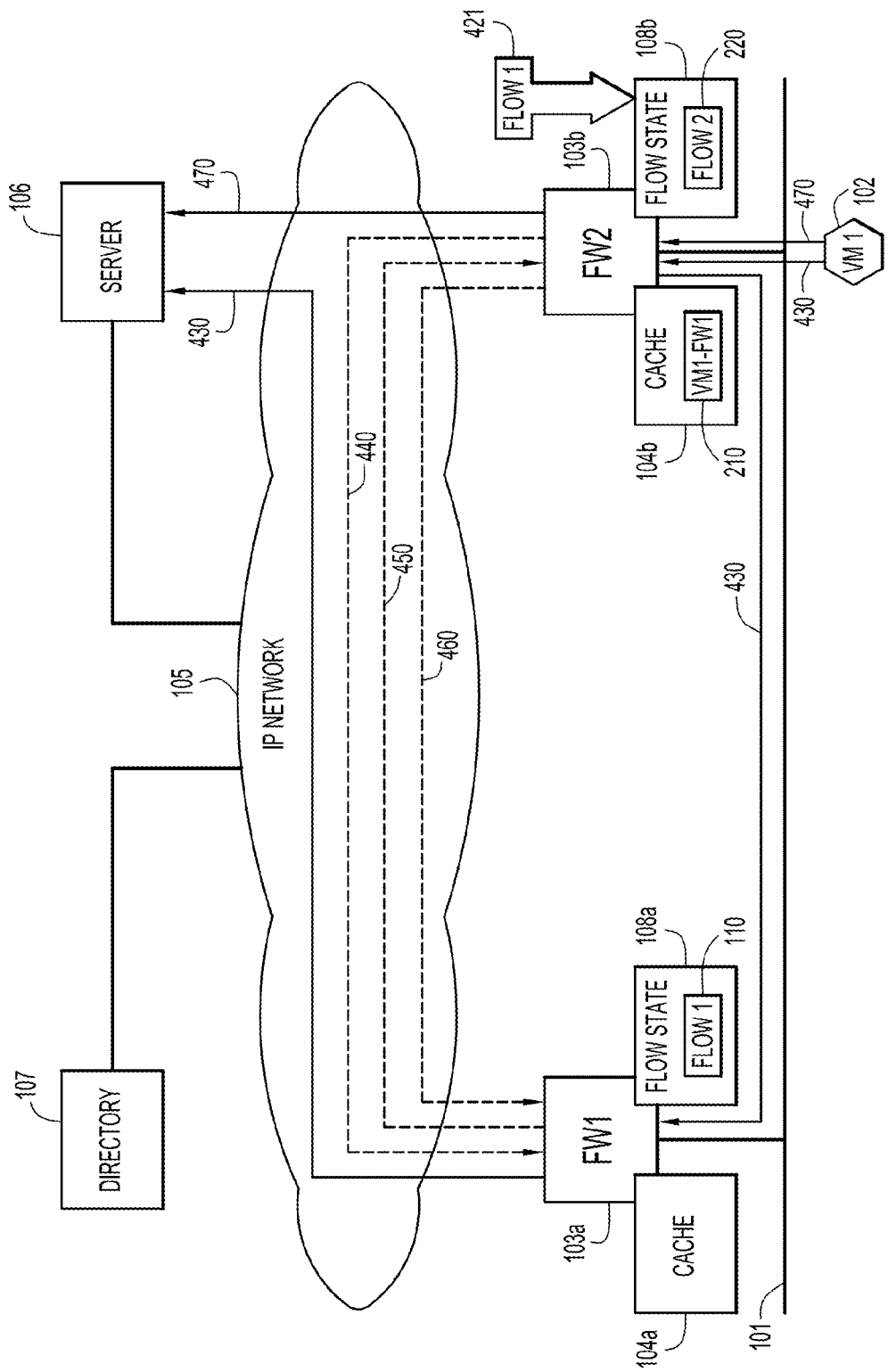
FIG. 4 illustrates another example redirection of messages and application of firewall policies to network traffic in a multi-firewall environment.

Referring now to FIG. 4, an additional process is shown by which the flow state can be transferred from one firewall to another. Under certain circumstances it may be beneficial to transfer the state from one firewall to another. For example, it may be more efficient to transfer the state for a flow from one firewall to another instead of constantly forwarding the messages for application of firewall policies at another firewall.

The process of FIG. 4 begins in a manner similar to that of FIG. 3. Message 430, which is part of Flow 1, is sent from virtual machine 102 to firewall 103b. When the message arrives at firewall 103b, flow state table 108b is checked to determine if firewall 103b maintains the state for Flow 1. When it is determined that firewall 103b does not currently maintain the state for Flow 1, cache 104b is checked to determine whether virtual machine 102 has been previously registered with another firewall. Entry 210 in cache 104b indicates that virtual machine 102 was previously registered at firewall 103a. In order to prevent any delay in the processing of message 430, message 430 is forwarded to firewall 103a where it is eventually forwarded to server 106.

Simultaneously, it may be determined that the flow state for Flow 1 should be transferred to firewall 103b. This determination may be based on efficiency to prevent future transferring of messages from firewall 103b to firewall 103a. For example, it may be determined that Flow 1 is likely to be a flow that will continue to be active for a long period of time. Such a determination could be made based on the type of information transmitted in Flow 1. Alternatively, cache 104b may include a counter which is incremented every time it is queried to determine if virtual machine 102 was previously registered to a different firewall. If the counter reaches a certain threshold, it may be determined that the flow states for virtual machine 102 at firewall 103a should be transferred to firewall 103b.

Whatever the mechanism used to determine that a transfer of flow states is appropriate, the process proceeds as follows. Firewall 103b sends message 440 to firewall 103a requesting the flow state for Flow 1. Firewall 103a responds with message 450 which includes the flow state for Flow 1 to firewall 103b. Having received the flow state for Flow 1, firewall 103b creates a new entry 421 in flow state cache 108b for Flow 1. Having successfully created entry 421, firewall 103b sends a confirmation message 460 to firewall 103a, indicating to firewall 103a that entry 112 in flow state table 108a can be marked as stale or deleted without concern that the flow state for Flow 1 will be lost. Accordingly, when virtual machine 102 sends message 470 for Flow 1, firewall 103b will be able to immediately process the message due to the presence of entry 421 in flow state table 108b, and forward message 470 on to server 106.

Figure 5:
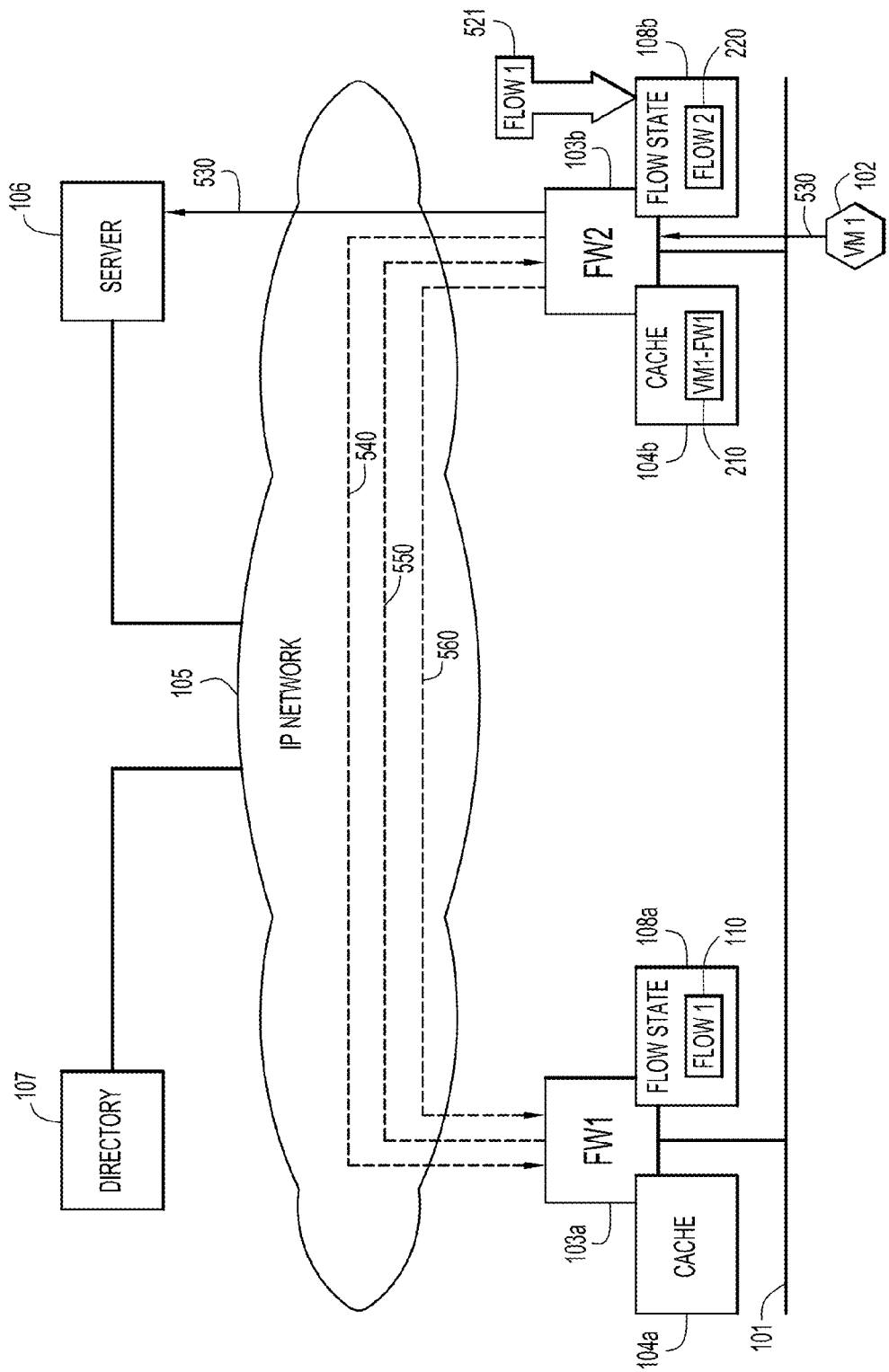
FIG. 5 illustrates another example application of firewall policies to network traffic in a multi-firewall environment.

Turning now to FIG. 5, depicted therein is process similar to that of FIG. 4, but instead of immediately forwarding message 530 to firewall 103a, message 530 is stored at firewall 103b while the flow state for Flow 1 is transferred from firewall 103a to firewall 103b. Accordingly, once it is determined at firewall 103b that Flow 1 is maintained at firewall 103a, message 540 is sent from firewall 103b to firewall 103a requesting that the flow state for Flow 1 be transferred to firewall 103b. Firewall 103a responds with message 550 which includes the flow state for Flow 1. Upon receiving message 550, firewall 103b creates a new entry 521 in flow state table 108b for Flow 1. Upon successful creation of entry 521, firewall 103b sends message 560 to firewall 103a which is an indication to firewall 103a that flow state entry 110 may be marked as stale or deleted without concern that the flow state for Flow 1 will be lost.

Figure 6:
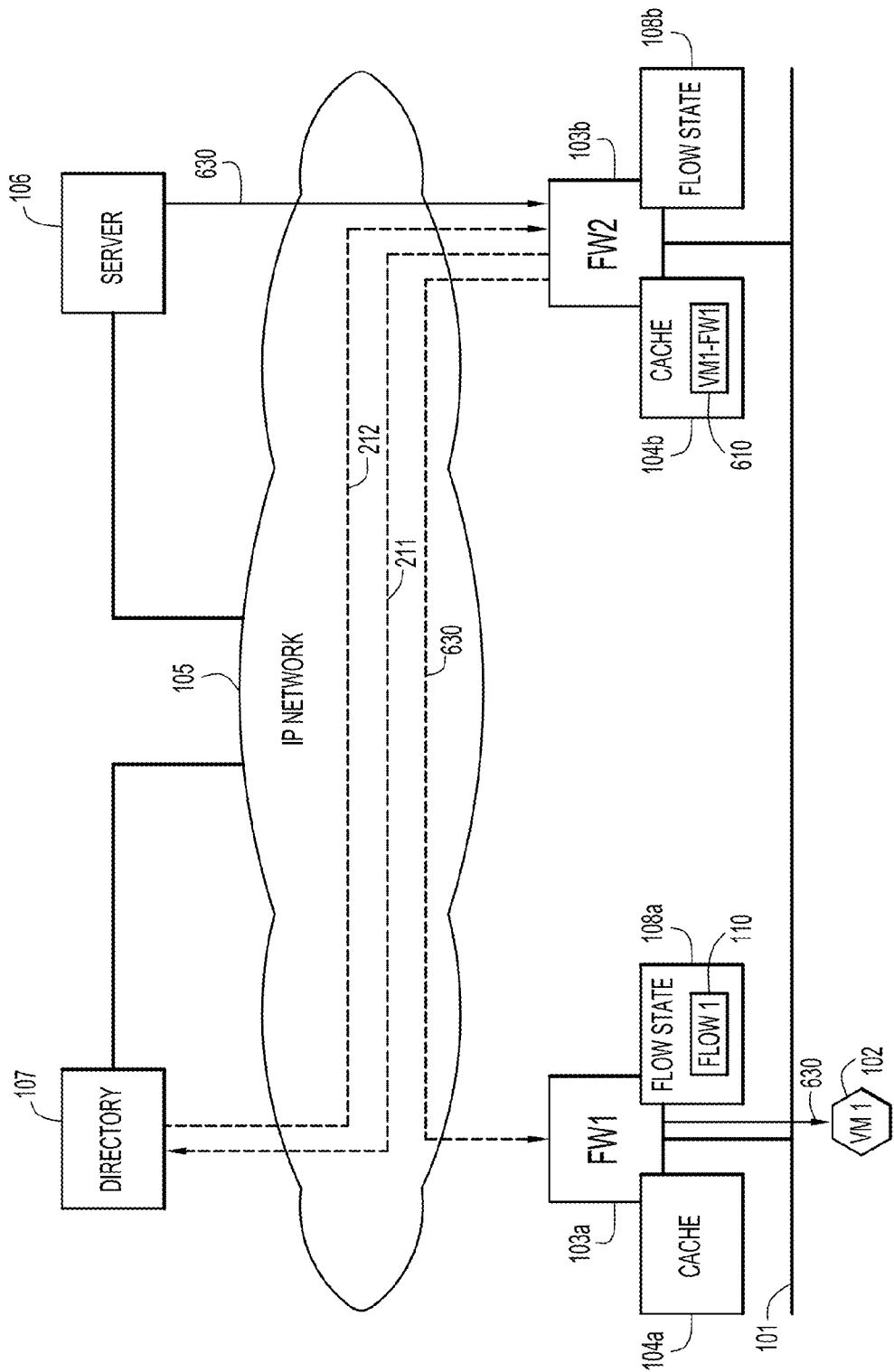
FIG. 6 illustrates yet another example redirection of messages and application of firewall policies to network traffic in a multi-firewall environment.
Figure 7:
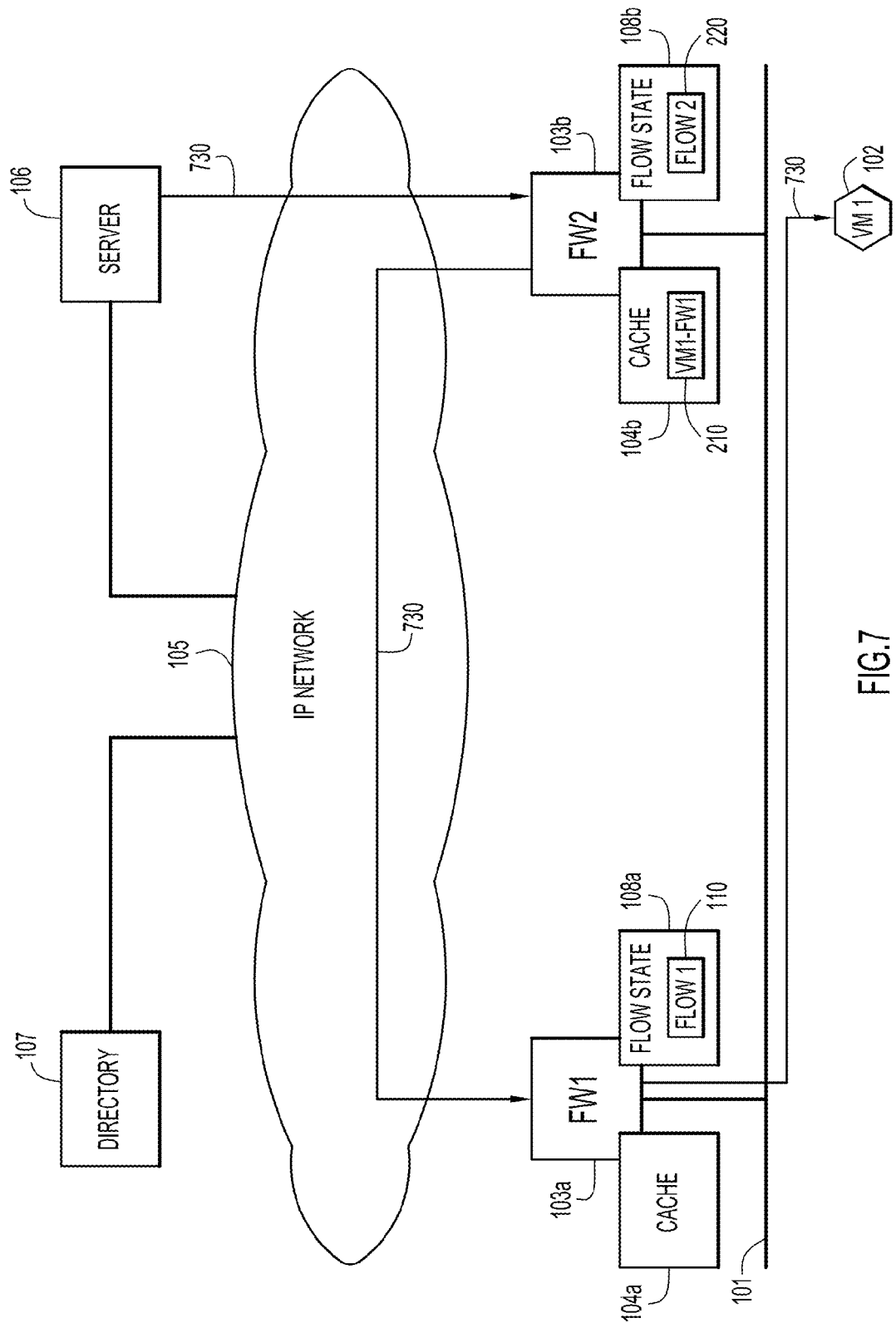
FIG. 7 illustrates yet another example redirection of messages and application of firewall policies to network traffic in a multi-firewall environment.
Figure 8:
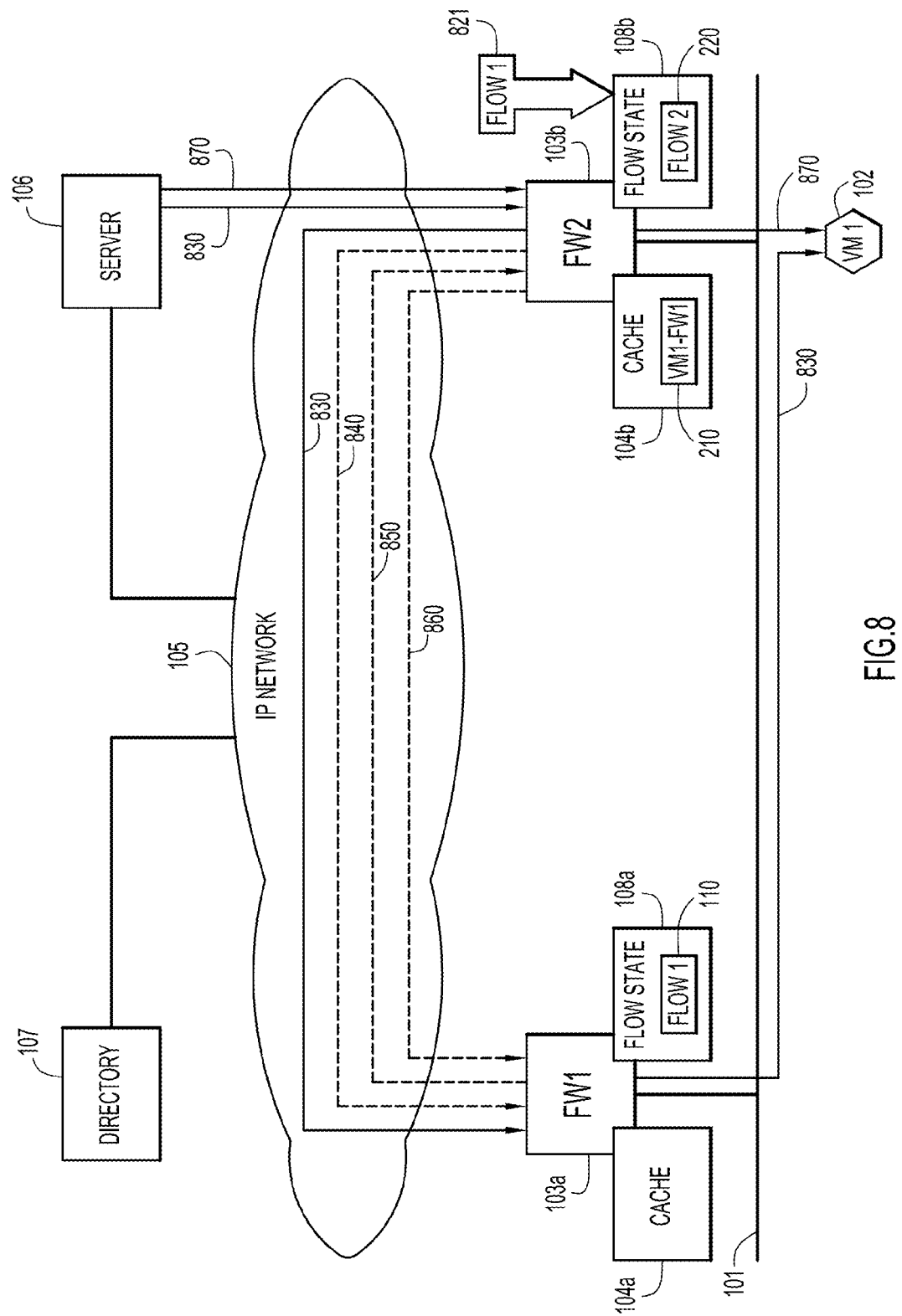
FIG. 8 illustrates a further example redirection of messages and application of firewall policies to network traffic in a multi-firewall environment.

Turning now to FIGS. 6-8, a description of how incoming traffic is processed is now provided. FIG. 6 begins with the assumption that virtual machine 102 initially registered with firewall 103a, but unlike FIGS. 2-5 above, virtual machine 102 has not yet moved and registered with firewall 103b. Server 106 sends message 630, which is part of Flow 1, and which is received at firewall 103b. Upon receiving message 630, firewall 103b checks flow state table 108b to see if it is presently maintaining the state for Flow 1. When it is determined that firewall 103b does not maintain the flow state for Flow 1, message 211 is sent from firewall 103b to directory 107 to determine if the final destination for message 630, i.e., the virtual machine 102, has been previously registered with a different firewall. Directory 107 responds with message 212 indicating that virtual machine 102 has been registered with firewall 103a. In response, firewall 103b creates an entry 610 in cache 104b indicating that virtual machine 102 is registered with firewall 103a. Furthermore, firewall 103b forwards message 630 to firewall 103a for processing at firewall 103a, and eventual forwarding to virtual machine 102.

With reference to FIG. 7, a scenario is illustrated in which the processing of FIG. 2 has completed, and a new message for Flow 1 is received from server 106. Specifically, FIG. 7 depicts a situation in which firewall 103a maintains the flow state for Flow 1, virtual machine 102 has moved, and is currently registered in directory 107 at firewall 103b. Firewall 103b maintains the flow state for Flow 2, and has an entry in cache 104b indicating that virtual machine 102 was previously registered to firewall 103a. Accordingly, when server 106 sends message 730 which is part of Flow 1 with a destination address of virtual machine 102, firewall 103b will first check if it maintains the flow state for message 730. Realizing it does not maintain the flow state for Flow 1, firewall 103b searches cache 104b, which indicates that virtual machine 102 was previously registered to firewall 103a. Accordingly, firewall 103b forwards message 730 to firewall 103a.

Upon receiving message 730, firewall 103a queries flow state table 108a. Upon finding entry 110, firewall 103a determines that it maintains the flow state for Flow 1, and therefore applies the appropriate policies to message 730. According to the example, message 730 is finally forwarded to virtual machine 102.

Turning now to FIG. 8, a scenario is shown similar to FIG. 7, but the determination is made that the flow state for Flow 1 should be transferred from firewall 103a to firewall 103b. Accordingly, when message 830, which is part of Flow 1, is received at firewall 103b, it is determined from flow state cache 108b that firewall 103b maintains the flow state for Flow 1. In response to this determination, message 830 is forwarded to firewall 103a. Upon receipt of the forwarded message 830, firewall 103a determines from flow state cache 108a that it maintains the flow state for Flow 1. Therefore, firewall 103a applies the appropriate policies to message 830, resulting in message 830 being forwarded to virtual machine 102.

While firewall 103a is applying policies to message 830, firewall 103b has made the determination that the flow state for Flow 1 would be best maintained at firewall 103b. Accordingly, firewall 103b sends message 840 to firewall 103a requesting the flow state for Flow 1. Firewall 103a responds with message 850 which includes the flow state for Flow 1. Upon receiving message 850, firewall 103b creates entry 821 in flow state table 108b in order to store the flow state for Flow 1. Once entry 821 is created, firewall 103b sends message 860 configured to indicate to firewall 103a that flow state table entry 110 in flow state table 108a can be marked as stale or deleted without concern that the flow state for Flow 1 will be lost.

Figure 9:
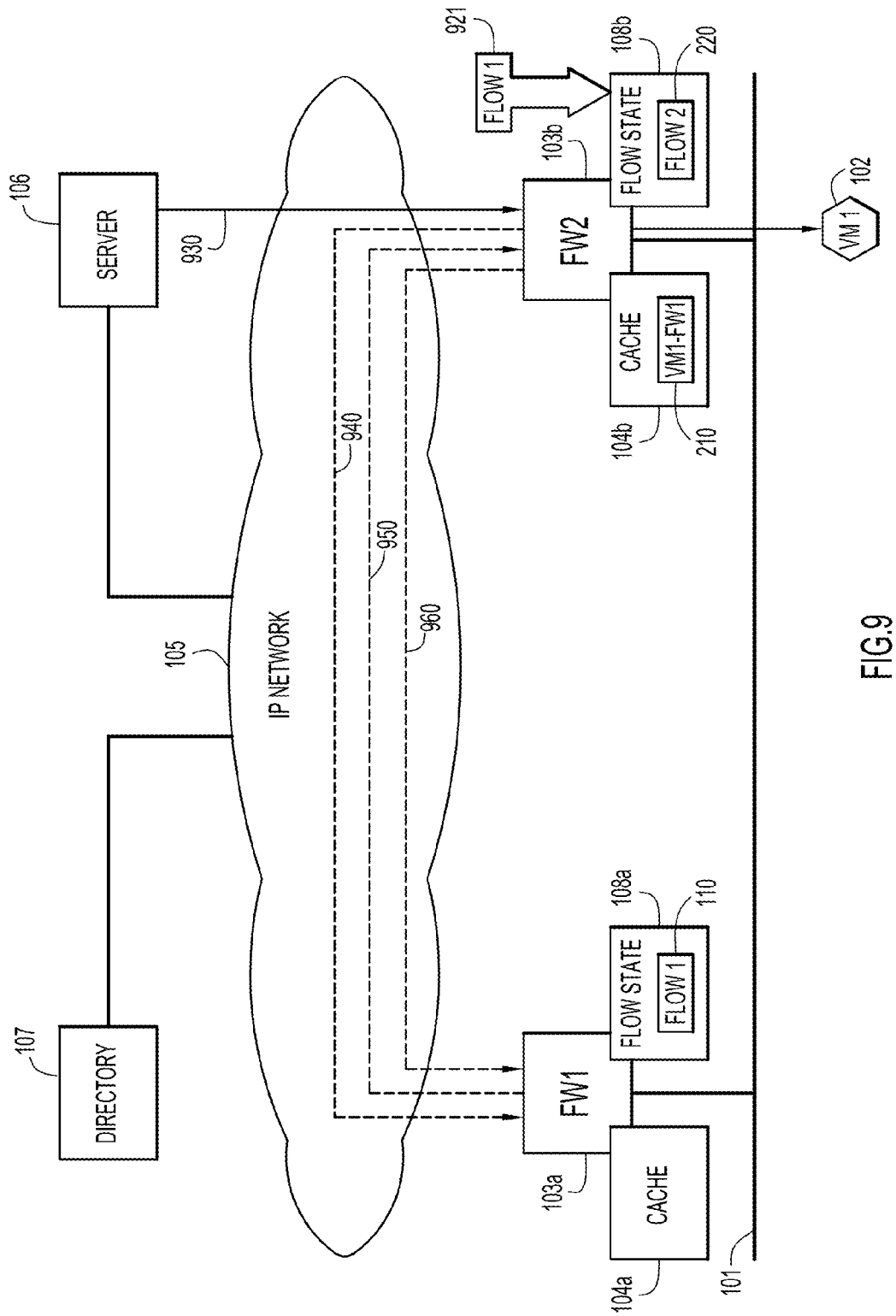
FIG. 9 illustrates a further example application of firewall policies to network traffic in a multi-firewall environment.

With reference now to FIG. 9, a process is described that is similar to that depicted in FIG. 8, except message 930, which is part of Flow 1, is stored at firewall 103b while the flow state for Flow 1 is requested from firewall 103a. Specifically, when message 930 is received at firewall 103b, it is determined from flow state table 108b that firewall 103b does not maintain the flow state for Flow 1. Accordingly, firewall 103b stores message 930, and sends to firewall 103a message 940 requesting the flow state for Flow 1. Firewall 103a responds with message 950 which includes the flow state for Flow 1. Upon receiving message 950, firewall 103b creates entry 921 in flow state table 108b in order to store the flow state for Flow 1. Once entry 921 is created, firewall 103b sends message 960 indicating to firewall 103a that flow state table entry 110 in flow state table 108*a* can be marked as stale or deleted without concern that the flow state for Flow 1 will be lost.

Figure 10:
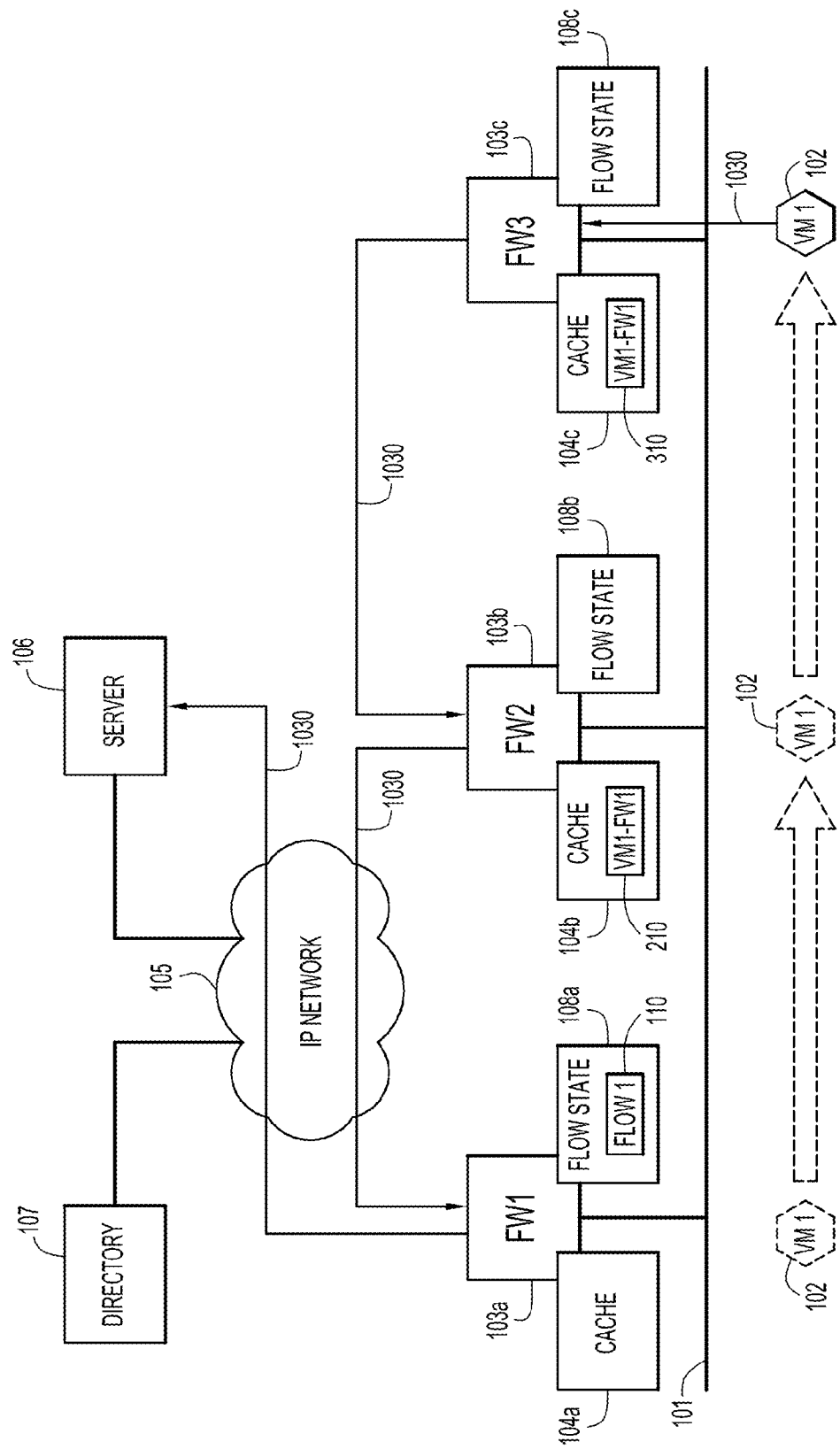
FIG. 10 illustrates a further example redirection of messages and application of firewall policies to network traffic in a multi-firewall environment.

Reference is now made to FIG. 10 for a description of redirecting of network traffic in a multi-firewall environment when an endpoint such as virtual machine 102 has moved two or more times. In the example of FIG. 10, virtual machine 102 first registers with firewall 103*a*. Subsequently, virtual machine 102 registers at firewall 103*b* according to the process described above with reference to FIG. 2. Finally, virtual machine 102 moves again, and once again registers, this time with firewall 103*c*, also according to the process described above with reference to FIG. 2.

After this second move, virtual machine 102 sends message 1030 which is part of Flow 1, and which is received at firewall 103*c*. First, firewall 103*c* checks flow state table 108*c*, and determines that the flow state for Flow 1 is not maintained at firewall 103*c*. Next, firewall 103*c* checks cache 104*c*. According to entry 310, which was recorded when virtual machine 102 registered with firewall 103*c*, virtual machine 102 was previously registered with firewall 103*b*. Accordingly, firewall 103*c* forwards message 1030 to firewall 103*b*.

Once message 1030 is received at firewall 103*b*, flow state table 108*b* is queried, and it is determined that firewall 103*b* also does not maintain the state for Flow 1. Accordingly, cache 104*b* is checked, where entry 210, which was created when virtual machine 102 previously registered with firewall 103*b*, indicates that virtual machine 102 was also previously registered with firewall 103*a*. Firewall 103*b* proceeds to forward message 1030 to firewall 103*a*.

Once message 1030 is received at firewall 103*a*, it is determined that flow state table 108*a* maintains the flow state for Flow 1. Accordingly, the appropriate policies are applied to message 1030, resulting in it being forwarded by firewall 103*a* to server 106.

Figure 11:
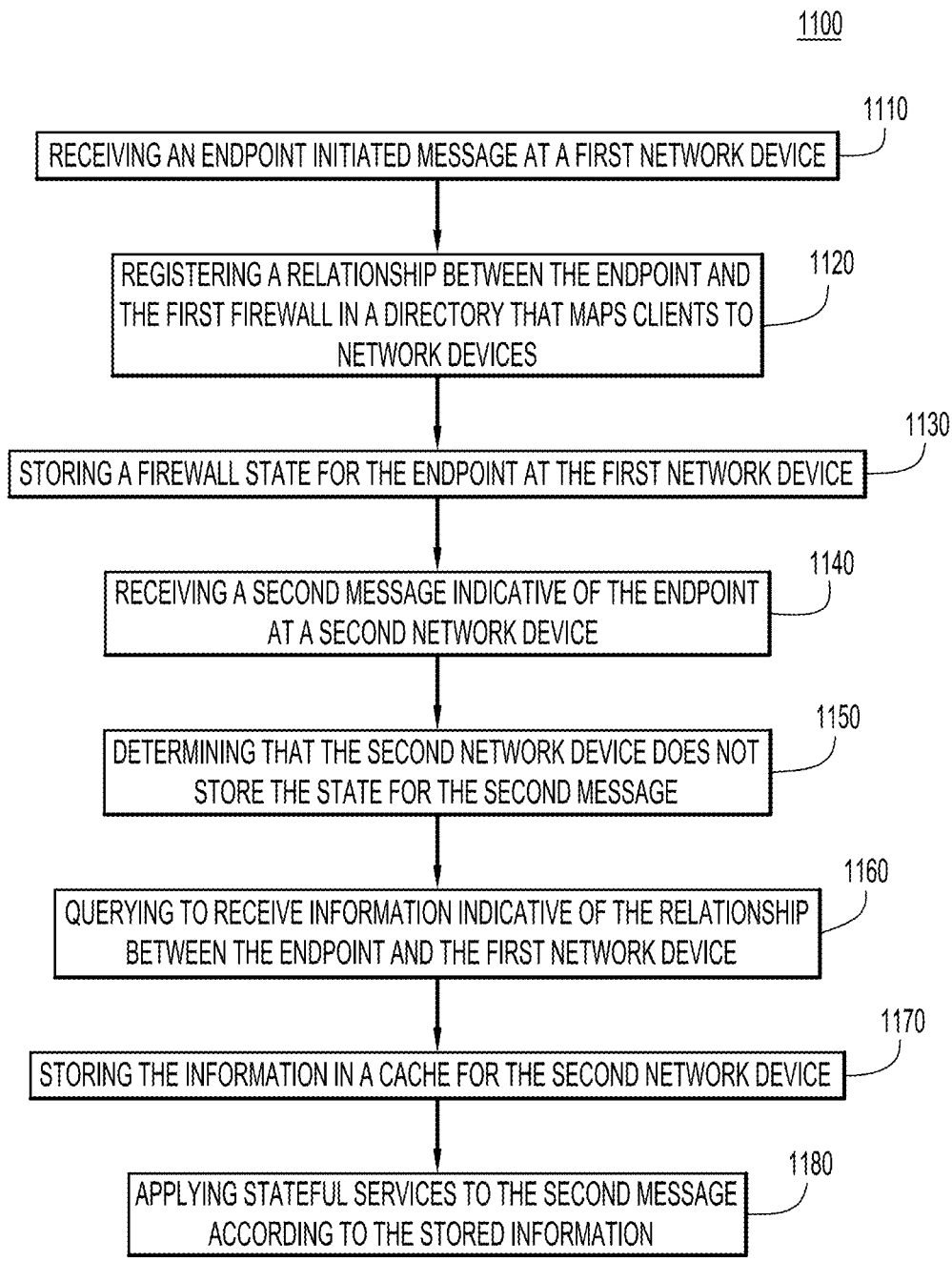
FIG. 11 is a flowchart that illustrates an example procedure for registering network device-endpoint mappings, redirecting messages and applying stateful services to network traffic.

Turning now to FIG. 11, depicted therein is a flow chart 1100 illustrating a method of traffic re-direction according to the techniques presented herein. As with the other examples described herein, the flow chart of FIG. 11 is in the context of a multi-firewall environment, but these techniques herein may be applied to other environments that implement stateful services. At step 1110 an endpoint initiated message is received at a first network device. The received message may be a SYN message for establishing a flow between an endpoint and a server external to the network device. After receipt of the message, a relationship between the endpoint and the first network device is registered in a directory in step 1120. The relationship may indicate that the most recent communication from the endpoint to a network device was received at the first network device, and therefore, the first network device is the closest network device to the endpoint that applies stateful services.

A flow state for the endpoint is stored at the first network device in step 1130. This state allows the network device to apply services to the flow established by the endpoint from the previously sent SYN message. The first network device may store the state in a flow state table.

In step 1140 a second message indicative of the endpoint is received at a second network device. As used herein, "second" in "second message" is used to distinguish this message from the end point initiated message discussed above, and does not require that the second message is the very next message received after the end point initiated message. In general, the second message may be any future messages of the same flow, such as messages beyond the initial session establishment handshake. This message may have been sent from the endpoint, and therefore, the endpoint would be indicated in the source address of the message. Alternatively, the message may have been received at the second network device from an external server, and therefore, will indicate the endpoint in the destination address of the message.

In step 1150 the second network device determines that it does not store the flow state for the flow associated with the second message. For example, the flow state table at the second network device may not store any state associated with the endpoint. Alternatively, the flow state table at the second network device may store states associated with the endpoint, but these states are for flows other than the flow associated with the second message.

The second network device does not maintain the state for the flow associated with the second message. Consequently, in step 1160 the second network device performs a query to receive information which will allow the appropriate services to be applied to the second message. According to some examples, this query is made to a cache located at the second network device to determine whether the second network device already stores information which indicates a previous relationship between the endpoint and another network device, such as the first network device. Alternatively, the query may be sent to the directory if the cache at the second network device does not contain any entries associated with the endpoint.

In step 1170, the queried information is stored in the cache at the second network device. If the second network device just received the information from the directory, the second network device creates a new entry in cache located at the second network device. Alternatively, if the information is already stored in the cache, the information associating the endpoint with a previous network device will be maintained in the cache of the second network device.

Finally, in step 1180, services are applied to the second message according to the stored in formation. The application of the services may be carried out in numerous ways. For example, the second message may be forwarded to the network device that maintains the state for the second message, such as described above in reference to FIGS. 3 and 7. Alternatively, the flow state for the flow associated with the second message may be forwarded to the second network device as described above in reference to FIGS. 5 and 9. According to other examples, the second message may be forwarded to another network device (e.g., the second firewall), with the flow state being copied to the second network device for further processing, as described above in reference to FIGS. 4 and 8. Furthermore, the application of the services may dictate that the second message be forwarded to multiple network devices, as described above in reference to FIG. 10.

Figure 12:
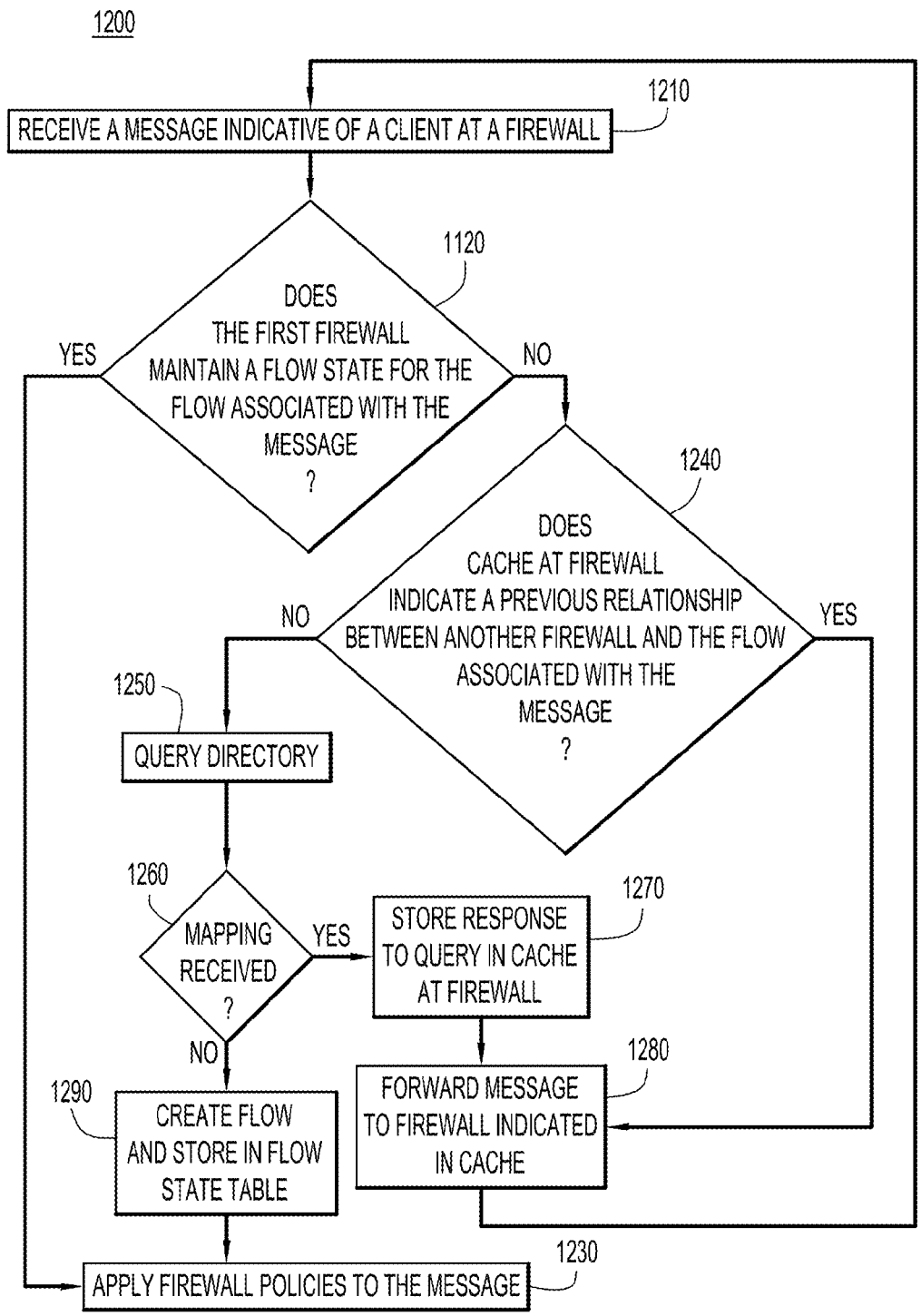
FIG. 12 is a flowchart that illustrates an example procedure for redirecting messages and applying network policies to network traffic.

Turning now to FIG. 12, depicted therein is a more detailed flow chart 1200 illustrating the process by which a firewall applies firewall services to a received message. The process begins at step 1210 when a firewall receives a message indicative of an endpoint. In step 1220, the firewall determines if it maintains a flow state for the flow associated with the received message. If the firewall maintains the flow state for the received message, the firewall applies the appropriate firewall policies in step 1230.

Alternatively, if the firewall does not maintain the state for the flow associated with the message, in step 1240 the firewall queries its local cache to determine if it has stored information indicating a previous relationship with another firewall. If the cache contains a record of a previous relationship with another firewall, the message is forwarded to that firewall in step 1280, and the process will begin again at step 1210 when the message is received at the new firewall.

If there is no entry in the cache indicating a previous relationship with another firewall, in step 1250 the present firewall will query a mapping directory to search for a previous relationship with another firewall. If, in step 1260, the firewall receives a response from the mapping directory indicating a previous mapping between the endpoint and another firewall, the firewall stores this information in its cache in step 1270. With the mapping stored, the message is forwarded to the firewall indicated in the response from the directory in step 1280, and the process will begin again at step 1210 when the forwarded message is received at the new firewall.

On the other hand, if a mapping is not received in step 1260, a new flow is created in the flow state table to handle the flow in step 1290. Subsequently, the appropriate firewall polices are applied in step 1230. Alternatively, if the message was initiated from outside the firewall, the message may be dropped.

Figure 13:
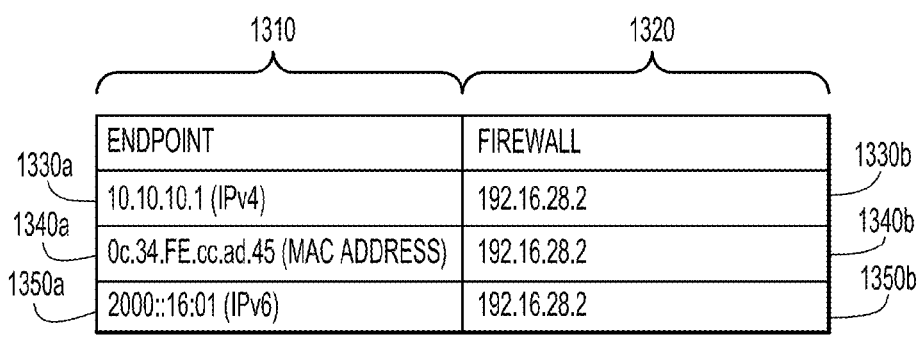
FIG. 13 illustrates an example mapping directory.

Reference is now made to FIG. 13 that shows an example mapping directory. The directory comprises two columns; the first column 1310 includes information indicative of an internal endpoint on the network. For example, the first entry 1330a in column 1310 includes an Internet Protocol version 4 (IPv4) prefix for an internal endpoint, the second entry 1340a includes a Media Access Control (MAC) address for an endpoint, and the third entry 1350a includes an Internet Protocol version 6 (IPv6) internal prefix for an internal endpoint. The network device column 1320 includes an address for the firewall associated with each of the endpoints. The three entries 1330a, b and c all share the same Secure Service Network (SSN) address, and therefore, all the endpoints are mapped to the same network device.

Figure 14:
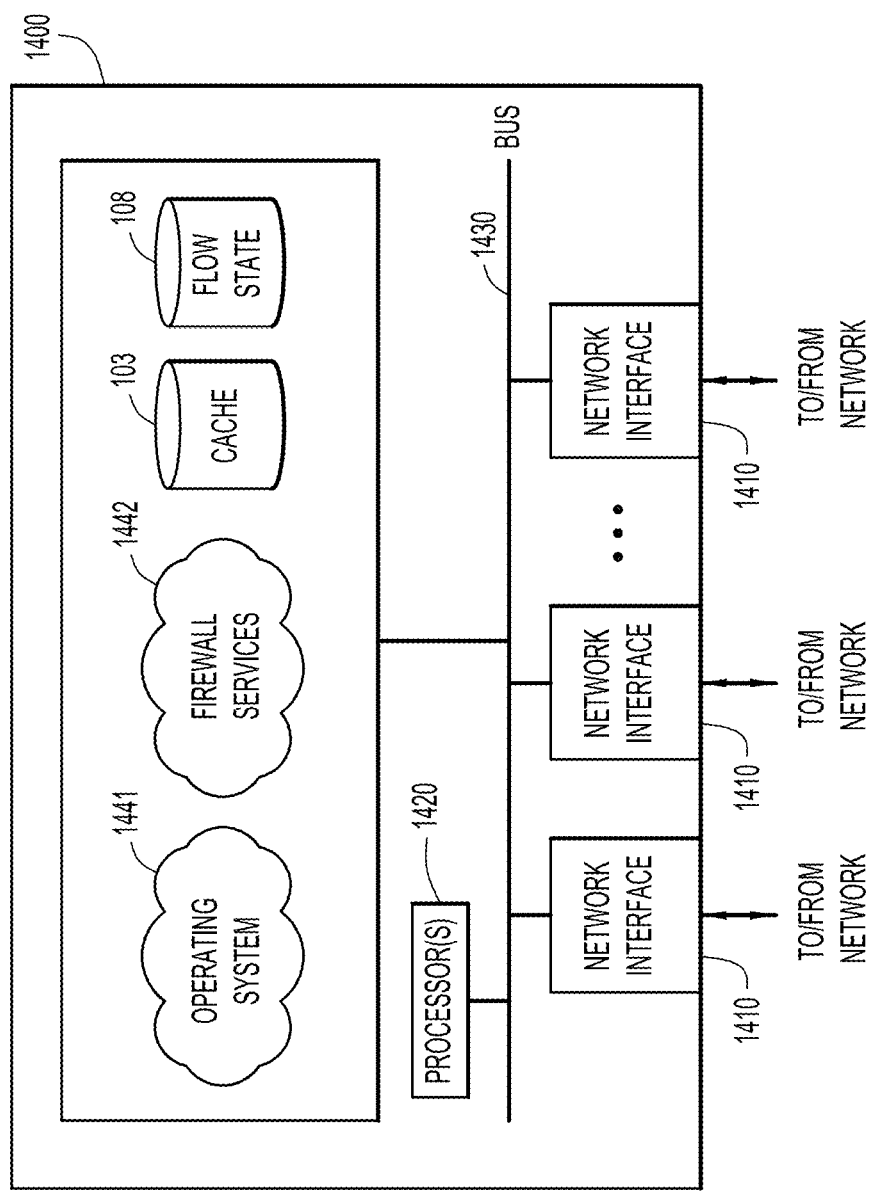
FIG. 14 is an example block diagram of a network device configured to perform redirection of messages and application of stateful services to network traffic.

Finally, turning to FIG. 14, depicted therein is an example block diagram of a network device, e.g., a firewall device, configured to perform the traffic control techniques described herein. The network device 1400 comprises network interfaces (e.g., ports) 1410, processor 1420, bus 1430, and memory 1440. For simplicity, the network interfaces 1410 may be referred to collectively as a network interface unit. The memory 1440 comprises software instructions for operating system 1441 and stateful services 1442, such as firewall services. The memory 1440 also includes cache 103 and flow state table 108.

Memory 1440 may comprise read only memory (ROM), random access memory (RAM), magnetic disk storage media devices, optical storage media devices, flash memory devices, electrical, optical, or other physical/tangible (e.g., non-transitory) memory storage devices. The processor 1420 is, for example, a microprocessor or microcontroller that executes instructions for the proxy device logic. Thus, in general, the memory 1440 may comprise one or more tangible (non-transitory) computer readable storage media (e.g., a memory device) encoded with software comprising computer executable instructions and when the software is executed (by the processor 1420), and in particular stateful services software 1442, it is operable to perform the operations described herein in connection with FIGS. 1-12.

In summary, the examples presented above provide methods and systems that allow for intelligent redirection of network traffic across any number of network devices that are distributed across any number of sites. Unlike other implementations of, for example, multi-firewall networks, the examples described herein provide for the handling of flows across multiple firewalls without requiring state synchronization between sites. Traffic symmetry is not required and allows for cross-site active/active firewall deployments. The mapping database is based on registering the internal prefixes when combined with a map-query based system, and as a result reduces the amount of inter-site control plane traffic. Adding and removing a site with an active firewall is quite simple and not disruptive.

These techniques may save significant bandwidth over other possible multi-firewall systems. For example, the techniques presented herein only redirect flows that have a flow state maintained at a different firewall. By being selective on when to redirect, additional significant bandwidth can be saved. Furthermore, the above-described techniques may be implemented, regardless of how many sites and how many firewalls are used.

Additionally, when these techniques are used over IP the techniques are transport agnostic.

The above description is intended by way of example only.

What is claimed is:

1. A method comprising:
   receiving a first message for a first flow from a network endpoint at a first network device;
   registering a relationship between the endpoint and the first network device in a directory that maps endpoints to network devices;
   storing a flow state for the first flow at the first network device;
   receiving a first message for a second flow from the network endpoint at a second network device;
   determining that the second network device does not store the flow state for the second flow;
   querying to obtain information indicative of the relationship between the first flow and the first network device in response to receiving the first message of the second flow to determine that the second network device does not store the flow state for the first flow;
   storing the information indicative of the relationship between the first flow and the first network device in a cache for the second network device;
   storing a flow state for the second flow at the second network device;
   registering a relationship between the endpoint and the second network device in a directory that maps endpoints to network devices;
   applying services to the first message for the second flow at the second network device;
   receiving a second message for the first flow at the second network device; and
   applying services to the second message of the first flow according to the stored information by forwarding the second message for the first flow to the first network device such that the services are applied to the second message for the first flow at the first network device.

2. The method of claim 1, wherein querying comprises querying the directory to obtain information indicative of the relationship between the first flow and the first network device.

3. The method of claim 1, wherein querying comprises querying the cache to obtain information indicative of the relationship between the first flow and the first network device.

4. The method of claim 1, wherein registering the relationship between the endpoint and the first network device comprises registering information indicating that the first network device applies services to messages communicated to or from the endpoint.

5. The method of claim 1, wherein storing the information in the cache comprises storing information indicating that the first network device applies services to messages communicated to or from the endpoint.

6. The method of claim 1, wherein receiving the second message comprises receiving an incoming message indicating the endpoint in a destination address of the second message.

7. The method of claim 1, wherein receiving the second message of the first flow comprises receiving an outgoing message indicating the endpoint in a source address of the second message.

8. The method of claim 7, wherein applying the services further comprises:
copying the flow state from the first network device to the second network device.

9. The method of claim 8, further comprising deleting the flow state from the first network device.

10. The method of claim 8, further comprising:
receiving at the second network device a third message of the first flow and indicative of the endpoint;
determining the second network device maintains the state for the flow; and
applying services to the third message at the second network device.

11. The method of claim 1, wherein receiving the second message of the first flow comprises receiving a message that is not a synchronize message.

12. The method of claim 1, wherein registering the relationship between the endpoint and the first network device comprises registering a relationship between the endpoint and a first firewall device, wherein storing the flow state for the first flow at the first network device comprises storing at the first firewall device; receiving the second message for the first flow comprises receiving the second message at a second firewall device; determining comprises determining that the second firewall device does not store the flow state for the flow; querying comprises querying to obtain information indicative of the relationship between the endpoint and the first firewall device; storing the information in the cache comprises storing the information in a cache for the second firewall device; and wherein applying services comprises applying firewall policies.

13. An apparatus comprising:
a network interface unit that enables communications over a network;
a memory storing policy data used to apply services to messages and having a first portion of which is allocated to serve as a flow state table and a second portion of which is allocated as a cache; and
a processor coupled to the memory and network interface unit, wherein the processor is configured to:
receive an endpoint initiated message for a first flow with a network endpoint;
determine that the flow state table of the memory does not store a flow state for the first flow;
register a relationship with the endpoint based upon the first flow in a directory that maps virtual machines to network devices;
store, in the memory, a flow state for the first flow in the flow state table;
query to obtain information indicative of a second flow associated with the endpoint in response to receiving the first message of the first flow;
receive the information indicative of the second flow, wherein the information indicates a network device configured to provide services for the second flow;
store the information indicative of the second flow in the cache of the memory;
receive a second message of the first flow;
apply the services to the second message of the first flow according to the policy data;
receive a message of the second flow; and
forward the message of the second flow to the network device configured to provide services for the second flow for application of the services for the second flow.

14. The apparatus of claim 13, wherein the memory stores the policy data in the form of firewall policy data.

15. The apparatus of claim 13, wherein the processor is further configured to receive data indicative of a flow state for the second flow.

16. The apparatus of claim 15, wherein the processor is further configured to store the data indicative of the flow state for the second flow in the flow state table.

17. The apparatus of claim 16, wherein the processor is further configured to:
receive a second message of the second flow;
determine that the flow state table maintains the state for the second flow; and
apply services to the second message of the second flow.

18. The apparatus of claim 17, wherein the processor is further configured to delete the information indicative of the second flow from the cache of the memory.

19. The apparatus of claim 13, wherein the message of the second flow comprises an incoming message indicating the endpoint in a destination address of the message of the second flow.

20. The apparatus of claim 13, wherein the message of the second flow comprises a message that is not a synchronize message.

21. The apparatus of claim 13, wherein the processor is configured to apply the services to the second message of the first flow by applying firewall services to the second message of the first flow.

22. The apparatus of claim 13, wherein the processor is configured to forward the message of the second flow to the network device for application of firewall services for the second flow.

23. A non-transitory computer readable storage media encoded with instructions that, when executed by a processor, cause the processor to:
receive at a first network device an endpoint initiated message for a first flow with a network endpoint;
determine that a flow state table of a memory of the first network device does not store a flow state for the first flow;
register a relationship between the first network device and the endpoint based upon the first flow in a directory that maps virtual machines to network devices;
store, in the memory of the first network device, a flow state for the first flow in the flow state table;
query to obtain information indicative of a second flow associated with the endpoint in response to receiving the first message of the first flow;
receive the information indicative of the second flow, wherein the information indicates a second network device configured to provide services for the second flow;
store the information indicative of the second flow in a cache of the memory;
receive a second message of the first flow;
apply services to the second message of the first flow according to policy data stored in the memory;

receive a message of the second flow; and forward the message of the second flow to the second network device configured to provide services for the second flow for application of the services for the second flow.

24. The computer readable storage media of claim 23, wherein the memory stores the policy data in the form of firewall policy data.

25. The computer readable storage media of claim 23, wherein the instructions further cause the processor to receive data indicative of a flow state for the second flow.

26. The computer readable storage media of claim 25, wherein the instructions further cause the processor to store the data indicative of the flow state for the second flow in the flow state table.

27. The computer readable storage media of claim 25, wherein the instructions further cause the processor to:

receive at the first network device a second message of the second flow;

determine the flow state table maintains the state for the second flow; and apply services to the second message of the second flow.

28. The computer readable storage media of claim 27, wherein the instructions further cause the processor to delete the information indicative of the second flow from the cache of the memory.

29. The computer readable storage media of claim 23, wherein the message of the second flow comprises an incoming message indicating the endpoint in a destination address of the message of the second flow.

30. The computer readable storage media of claim 23, wherein the message of the second flow comprises a message that is not a synchronize message.

31. The computer readable storage media of claim 23, wherein the instructions further cause the processor to apply the services to the second message of the first flow by applying firewall services to the second message of the first flow.

32. The computer readable storage media of claim 23, wherein the instructions further cause the processor to forward the message of the second flow to the second network device for application of firewall services for the second flow.

* * * * *